United States Patent
Dollinger et al.

[11] Patent Number: 5,970,857
[45] Date of Patent: Oct. 26, 1999

[54] BAKING OVEN

[75] Inventors: Rainer Dollinger, Dinkelsbühl; Josef Hafner, Schopfloch; Claudia Knost, Dinkelsbühl, all of Germany

[73] Assignee: Werner & Pfleiderer Lebensmitteltechnik GmbH, Dinkelsbühl, Germany

[21] Appl. No.: 09/298,059

[22] Filed: Apr. 22, 1999

[30] Foreign Application Priority Data

May 6, 1998 [DE] Germany ............... 198 20 066

[51] Int. Cl.⁶ ............... A47J 37/00; A21B 1/00; A21B 1/48; B65G 17/18
[52] U.S. Cl. ............... 99/443 C; 99/386; 99/477; 126/19 R; 126/21 A; 198/458; 198/778; 432/145; 432/152
[58] Field of Search ............... 99/339, 340, 386, 99/373, 423, 443 R, 443 C, 477–479, 476, 483; 126/21 A, 19 R; 198/778, 798, 833, 458, 498, 181, 209, 175; 219/388, 400; 426/523, 500, 499; 432/144, 145, 152, 133, 138, 175

[56] References Cited

U.S. PATENT DOCUMENTS

| | | | |
|---|---|---|---|
| 4,377,109 | 3/1983 | Brown et al. | 99/386 X |
| 4,590,916 | 5/1986 | Konig | 126/21 A |
| 4,739,154 | 4/1988 | Bharara et al. | 219/388 |
| 4,753,215 | 6/1988 | Kaminski et al. | 99/443 C |
| 4,952,145 | 8/1990 | Kwiatkowski et al. | 432/175 X |
| 5,033,366 | 7/1991 | Sullivan | 99/443 C |
| 5,230,421 | 7/1993 | Hoegger | 99/477 X |
| 5,265,524 | 11/1993 | Seletti | 99/386 |
| 5,351,804 | 10/1994 | Haberstroh | 198/778 X |
| 5,396,835 | 3/1995 | Savolainen et al. | 99/443 C |
| 5,702,245 | 12/1997 | London | 198/778 X |
| 5,832,812 | 11/1998 | Wolfe et al. | 432/152 X |
| 5,875,705 | 3/1999 | Knost | 432/145 X |

OTHER PUBLICATIONS

Schramm, Bernhard., "Machinenlehre Backwaren.", VEB Fachbuchverlag, Leipzig, 1982, Aufl., S 184–187.

*Primary Examiner*—Timothy Simone
*Attorney, Agent, or Firm*—Browdy & Neimark

[57] ABSTRACT

In a baking oven comprising at least one hearth, a baking conveyor belt, which is guided over a deflection roller, is allocated to each hearth. The deflection roller is extended out of the baking oven through openings where it is lodged for displacement in the direction of the oven. A sealing arrangement is provided for this opening to be sealed, comprising a base plate and a sealing disk resting tightly thereon. The sealing disk is pivotally supported on the deflection roller and simultaneously lodged in a guiding groove in the base plate by means of a guide pin. The edge of the sealing disk is shaped such that on the one hand it covers the opening in all the positions of displacement and on the other hand is displaced in the direction of displacement only by a length which is considerably shorter than the length of displacement of the deflection roller.

5 Claims, 4 Drawing Sheets

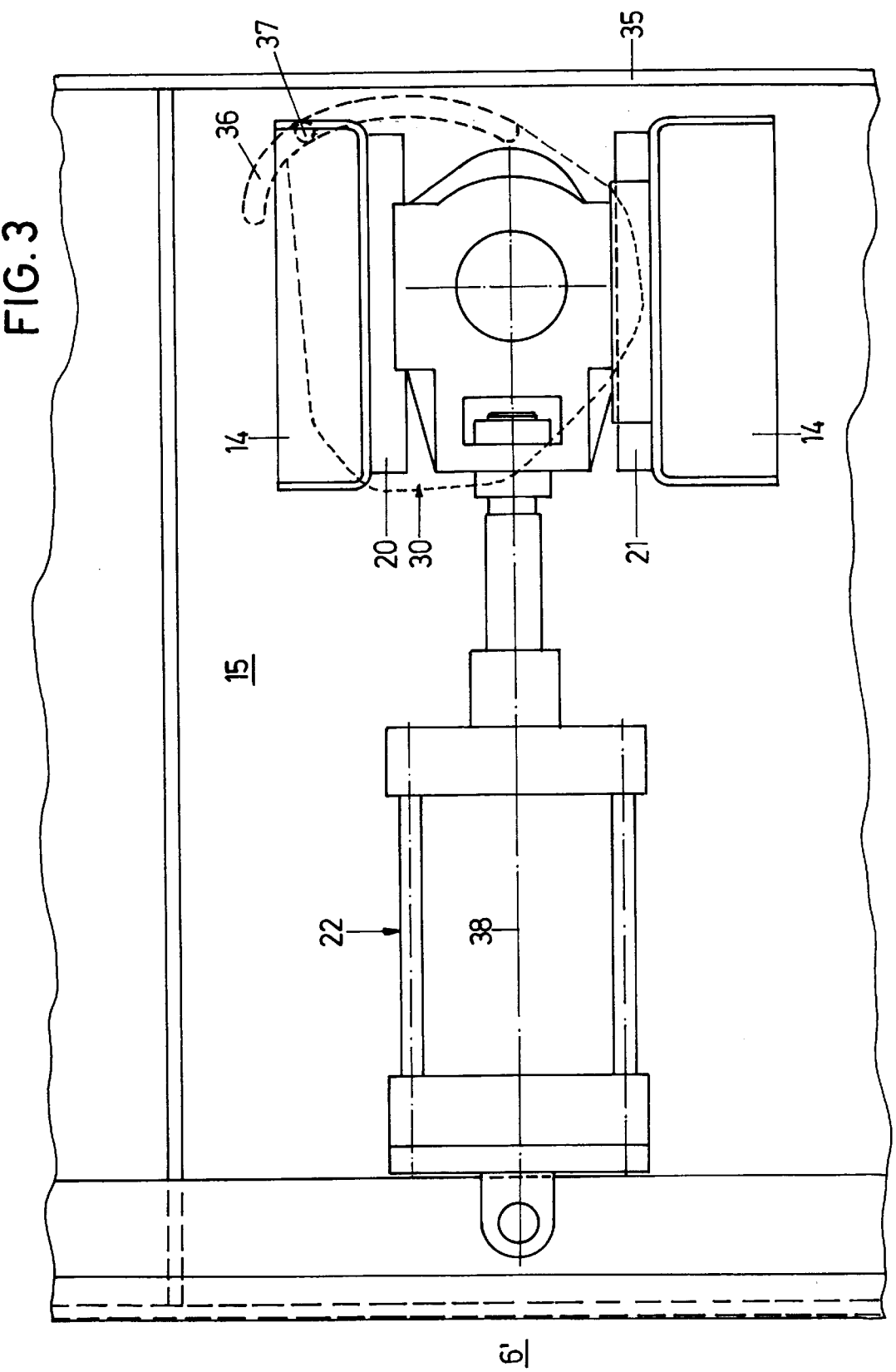

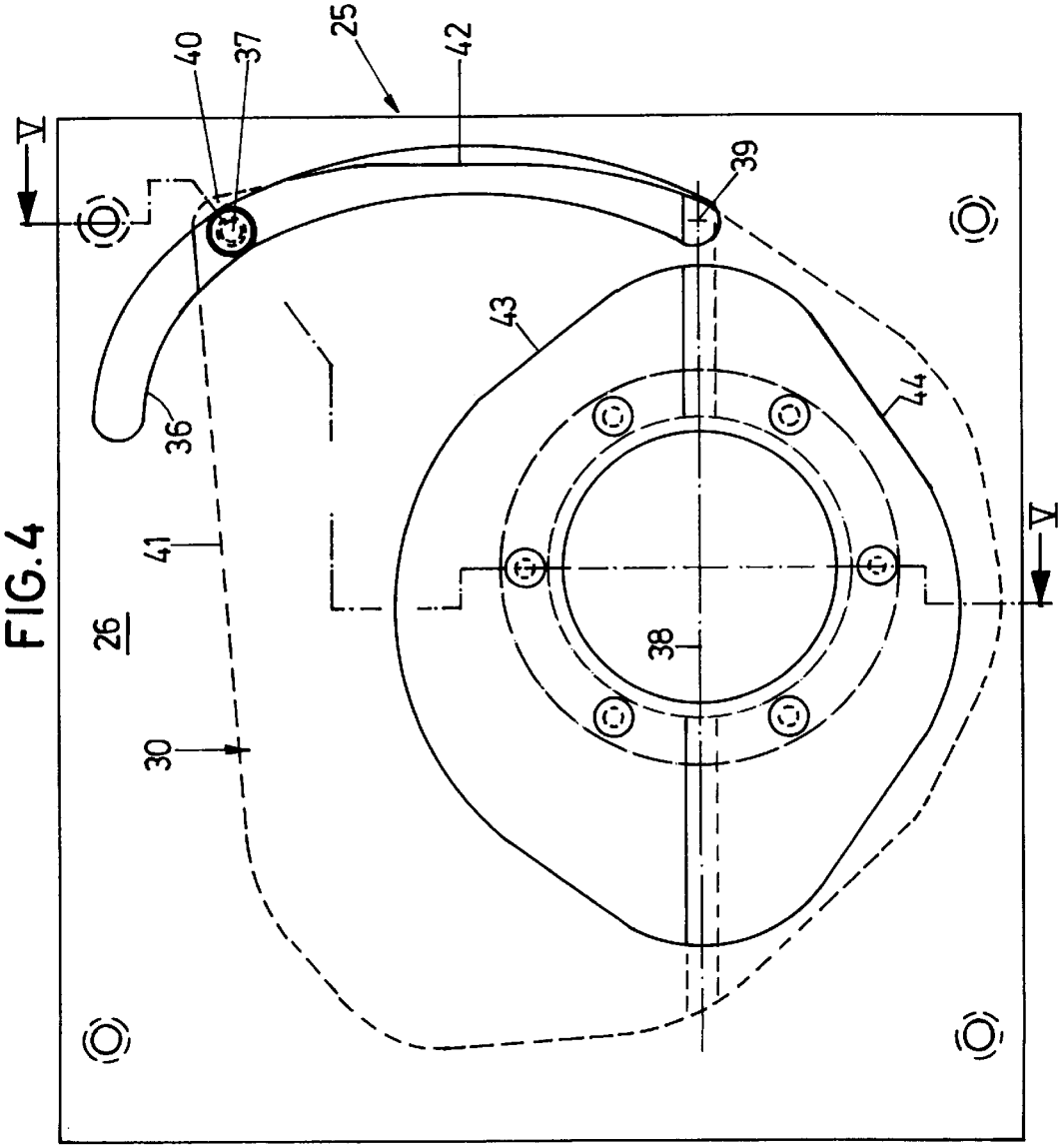

BAKING OVEN

BACKGROUND OF THE INVENTION

1. Field of the Invention

The invention relates to a baking oven comprising a housing having side walls; at least one hearth formed in the housing and defined by the side walls thereof; a driving roller provided at one end of each hearth; a deflection roller provided at the other end of each hearth; a baking conveyor belt guided over the driving roller and the deflection roller; two bearings for at least one roller which are provided on the outsides of the housing and displaceable in a horizontal direction of displacement in the lengthwise direction of the respective hearth; a recess formed in each side wall and penetrated by the displaceable roller and adjusted to a maximal length of displacement of the roller; and a sealing arrangement for sealing the recess in each position of displacement of the roller.

2. Background Art

In baking ovens of the generic type, which are regularly multi-deck baking ovens of comparatively great length, the temperature dependent expansions of the housing on the one hand and of the baking conveyor belt on the other vary considerably. For this reason the deflection roller or the driving roller, as a rule the deflection roller, must be displaceable in the lengthwise direction of the respective hearth. Since the bearings of the respective roller are disposed out of the hearth, i.e. on the outside of the side walls of the housing, a recess must be available in the side wall, through which the roller or a corresponding shaft section thereof is extended outwards and in which it is displaceable in the lengthwise direction of the respective hearth. Since the dough pieces must be treated with vapor at the beginning of the baking process, i.e. directly after feed, it is necessary that this vapor is retained for a certain time in the respective baking chamber. Any uncontrolled escape of vapor through the mentioned recesses would lead to drawbacks in baking implementation and must be precluded. Filling up the recesses with a packing of insulating material as tried in practice did not give satisfying results; moreover, the vapor precipitates in this insulating material, leading to thorough moistening. Furthermore, the space available in the direction of displacement of the roller is strongly restricted.

SUMMARY OF THE INVENTION

It is an object of the invention to embody a baking oven of the generic type such that reliable sealing of the recesses serving for the guidance of the roller is ensured even in the case of restricted space available in the direction of displacement and great lengths of displacement of the roller.

According to the invention, this object is attained in that the sealing arrangement comprises a sealing disk, which is disposed before the recess pivotally on the roller and which, upon displacements of the roller in the direction of displacement, is pivotal about the central longitudinal axis of the roller by means of a guide pin guided in a guiding groove, the edge of the sealing disk being shaped such that on the one hand it covers the recess in all the positions of displacement and on the other hand is displaced in the direction of displacement only by a length which is considerably shorter than the length of displacement of the roller. The gist of the invention resides in that on the one hand the recess in the form of an oblong hole is covered by the sealing disk in all the positions of displacement and on the other hand the sealing disk needs no projection corresponding to the length of displacement in the direction of displacement. This projection can be extremely small.

Further features, advantages and details will become apparent from the ensuing description of an exemplary embodiment, taken in conjunction with the drawing.

BRIEF DESCRIPTION OF THE DRAWING

FIG. 3 is a partial lateral view of the head element of the baking oven corresponding to the arrow III in FIG. 2;

FIG. 4 is a plan view of a base plate of a sealing arrangement corresponding to the arrow IV in FIG. 3; and FIG. 5 is a section through FIG. 4 on the line V—V in FIG. 4.

DESCRIPTION OF THE PREFERRED EMBODIMENT

Figure 1:
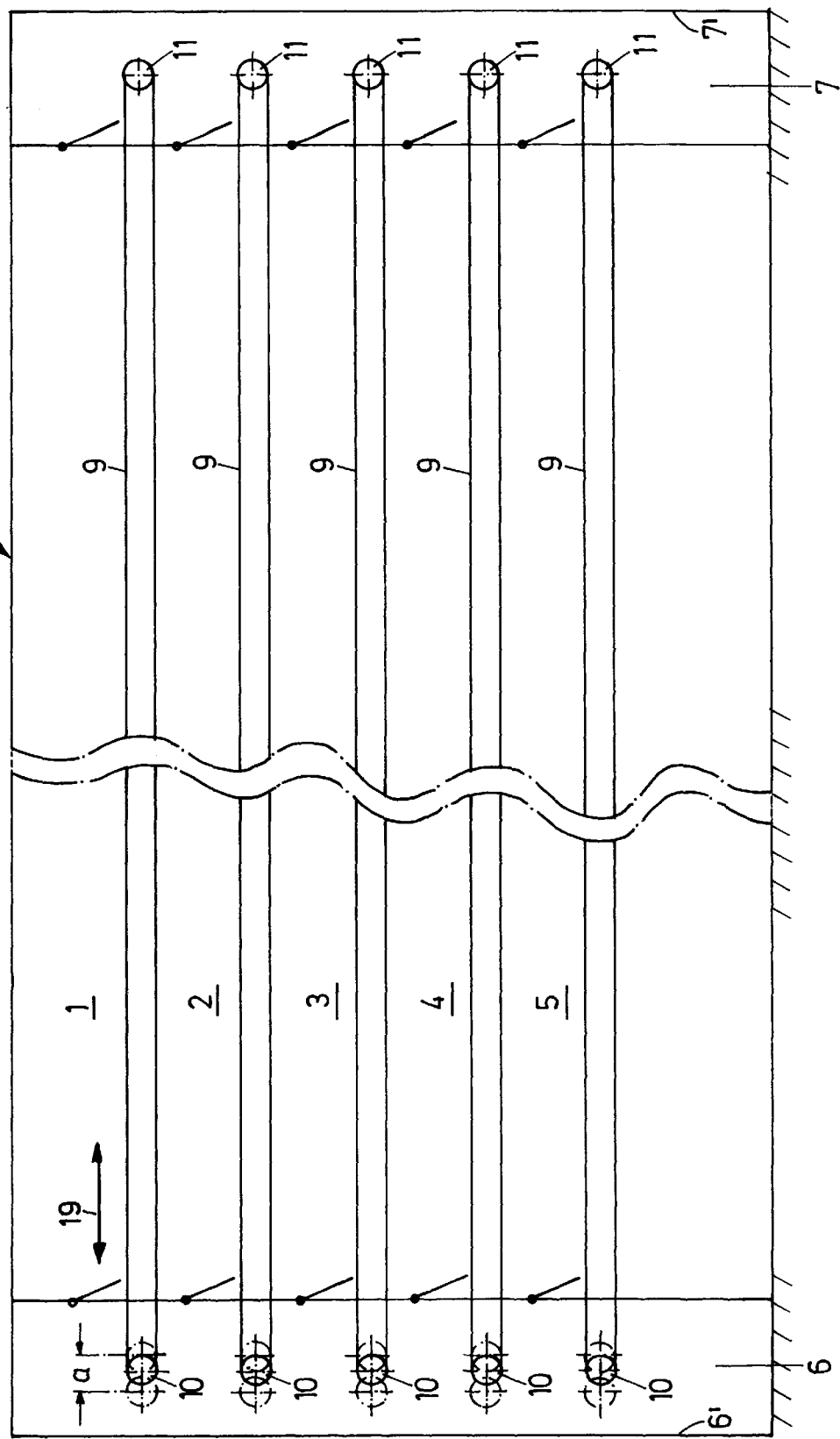
FIG. 1 is a strongly diagrammatic lengthwise cut through a multi-deck tunnel oven.

FIG. 1 roughly illustrates a multi-deck baking oven totaling five hearths 1 to 5 disposed one above the other. The baking oven comprises a head member 6 and a tail member 7, which define the housing 8 of the baking oven on the charging side 6' and on the discharging side 7'. Allocated to each hearth 1 to 5 is a continuous baking conveyor belt 9, on which the dough pieces are conveyed through the baking chambers of the hearths 1 to 5. These baking conveyor belts 9 are guided over deflection rollers 10 in the head member 6 and driving rollers 11 in the tail member 7. The driving rollers 11 are lodged stationarily in the housing, whereas the deflection rollers 10 lodged in the head member 6 are displaceable horizontally, i.e. in the direction of the respective baking conveyor belt 9 for the compensation of varying, temperature dependent expansions of the housing 8 on the one hand and of the baking conveyor belts 9 on the other.

Figure 2:
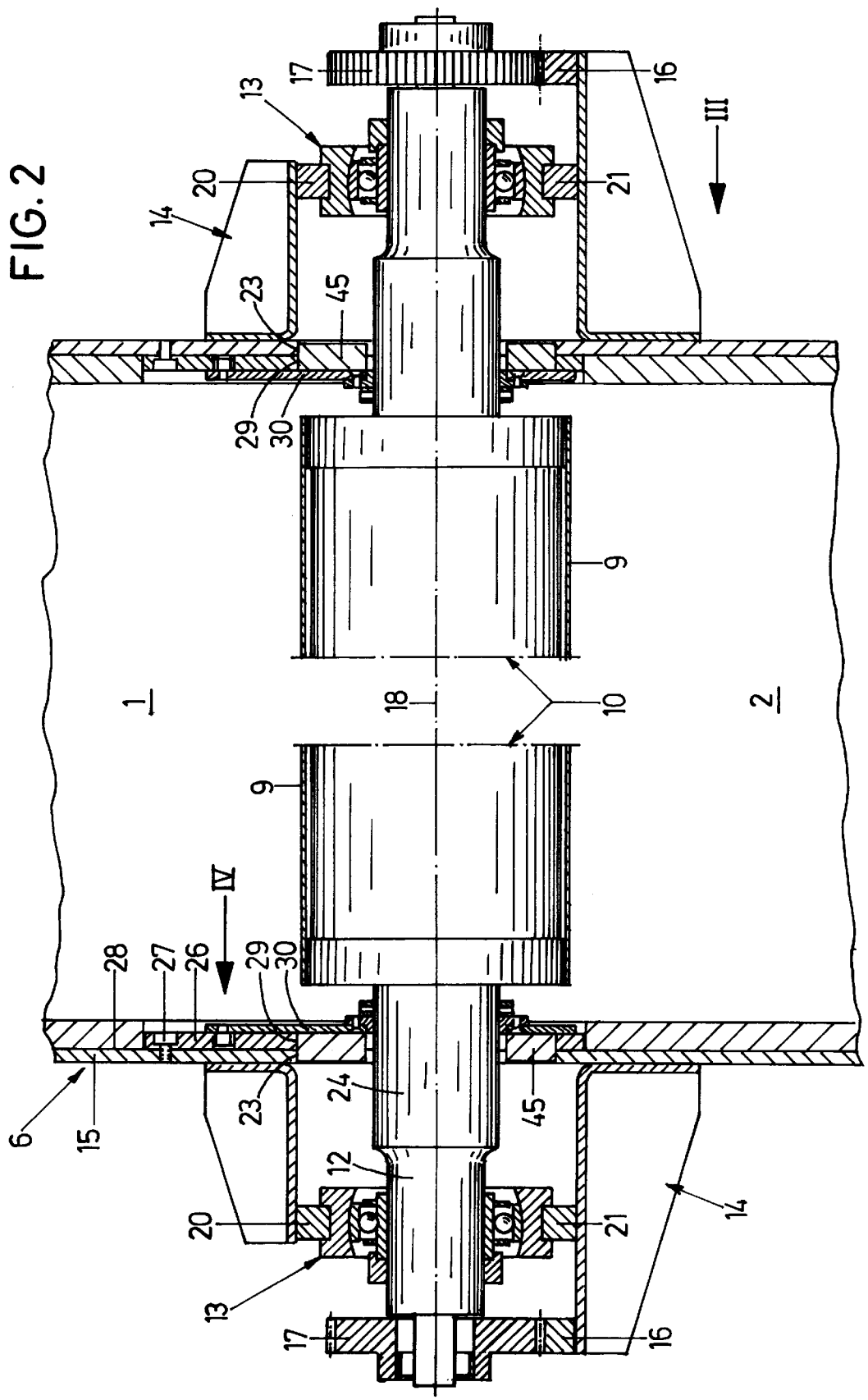
FIG. 2 is a partial cross-section through the head member of the baking oven.

As seen in FIG. 2, the deflection rollers 10 are run on both sides in bearings 13 by means of bearing journals 12. These bearings 13 are again supported in bearing blocks 14, which are mounted on the respective outside of the side walls 15 of the head member 6. Mounted on these bearing blocks 14 are racks 16, on which pinions 17 roll which are non-rotatably connected to the respective bearing journal 12 and thus to the deflection roller 10. Due to the fact that provision is made for pinions 17 of this type, which engage with tooth racks 16 and are completely identical, the two bearing journals 12 are forcibly coupled, as a result of which the deflection roller 10 is displaceable precisely parallel to itself, i.e. to its central longitudinal axis 18, in the direction of displacement 19 in the lengthwise direction of the baking oven.

As seen in FIGS. 2 and 3, each bearing 13 is guided for displacement in an upper and lower guide rail 20 and 21, the guide rails 20 and 21 being mounted on the respective bearing block 14 and extending in the direction of displacement 19. A clamping member 22 for instance in the form of a pneumatically actuated piston-cylinder unit acts on the bearing 13. These clamping members 22, which are allocated to the two bearings 13, act on the bearings 13 in the direction towards the charging side 6', i.e. to the left in FIGS. 1 and 3.

As only roughly outlined in FIG. 2 and seen in detail in FIGS. 4 and 5, the respective side wall 15 of the head member 6 has a recess 23, through which the deflection roller 10 shaft 24, which comprises the bearing journals 12, is extended outwards.

For reasons of assembly, this recess 23 is not circular with a diameter corresponding to that of the shaft 24, but has a non-circular cross-section of a greater extension in the horizontal direction of displacement 19 than in the vertical. This comparatively great recess 23 is sealed by means of a sealing arrangement 25. To this end, a sealing base plate 26 is attached to the inside 28 of each side wall 15 in a steam-tight manner by means of screws 27, it being possible that a sealing compound is applied between the base plate 26 and the side wall 15. This base plate 26 has an opening 29 which is congruent with the recess 23. Sealing the recess 23 and the opening 29 takes place by means of a sealing disk 30, which is disposed from within the baking oven, i.e. on the side turned towards the respective baking chamber, and bears tightly on the base plate 26. By means of screws 31, the sealing disk 30 is releasably connected to a guide ring 32, which is mounted freely rotatably, but substantially without play and thus approximately steam-tight on the shaft 24. The guide ring 32, and thus the sealing disk 30, is held in a position resting tightly on the base plate 26 by means of a fixing ring 33, which is retained on the shaft 24 by means of locking screws 34 and prevents the guide ring 32 with the sealing disk 30 from migrating into the head member 6.

Since—as seen in particular in FIG. 3—an obstacle, which is formed for instance by a wall element 35 that stands out inwardly where the head member 6 passes into the housing 8 of the baking oven, does not allow any straight displacement of a sealing disk 30 parallel to itself in the direction of displacement 19 over a maximum length of displacement a of for instance a total of 125 mm, measures have been taken for the sealing disk 30 to be pivoted upwards out of the way when it approaches this wall element 35 which constitutes an obstacle to displacement. In this case, it must of course be ensured that the sealing disk 30 completely seals the recess 23 and the opening 29 in all the positions of displacement, i.e. it must not only cover the recess 23 and the opening 29, but must rest entirely on the base plate 26 also around the recess 23 and the opening 29. To this end, a guiding groove 36 is formed in the base plate 26, a guide pin 37 mounted on the sealing disk 30 engaging therewith. The guiding groove 36 is disposed in vicinity to the wall element 35, which constitutes the obstacle to displacement, and proceeds from the axis of displacement 38 of the clamping element 22 and of the bearings 13 which runs through the central longitudinal axis in the direction of displacement 19. From there, the guiding groove 36 is slightly curved, extending upwards at first slightly in the direction towards the wall member 35 and then in the opposite direction as seen in particular in FIG. 4. As a result of this design of the guiding groove 36, the sealing disk 30, when displaced from its position of utmost retraction from the clamping element 22 in which the guide pin 37 is situated at the lower starting point 39 of the guiding groove 36, is pivoted on the shaft 24 such that the sealing disk 30 front section 40 neighboring the guide pin 37 and turned towards the wall element 35 moves along the course of the guiding groove 36 when the deflection roller 10 is moved in the direction of displacement 19 towards the housing 8. To this end, the sealing disk 30 comprises two edge sections 41, 42 of approximately rectangular extension relative to each other in particular on both sides of the guide pin 37. When the sealing disk 30 is in its position completely retracted towards the charging side, these edge sections 41, 42 lie beyond the associated edge sections 43, 44 of the recess 23 and of the opening 29. Upon displacement of the deflection roller 10 in the direction towards the wall element 35, the lower edge section 42 is pivoted upwards from a position sloping downwards by approximately 45°, into an approximately vertical position as seen in FIG. 4, and is then inclined backwards relative to the vertical line. During the comparatively long displacement over a length a of for instance 125 mm in the direction of displacement 19, the sealing disk 30 is not moved closer to the wall element 35 beyond the course of the guiding groove 36. The horizontal displacement of the sealing disk 30 is largely translated into an upward sweep in which the portion next to the wall element 35 which constitutes an obstacle to displacement does not move any closer to the wall element 35.

Even if the recess 23 and the opening 29 are filled up with removable insulating material 45 as roughly outlined in FIG. 2, the recess 23/opening 29 must be sealed completely.

If adequate space is available, the guiding groove 36 could of course also extend downwards, i.e. in an arrangement mirrored relative to the axis of displacement 38.

What is claimed is:

1. A baking oven comprising
    a housing (8) having side walls (15);
    at least one hearth (1 to 5) formed in the housing (8) and defined by said side walls (15) and having a first end and a second end and a lengthwise direction;
    a driving roller (11) provided at the first end of each hearth (1 to 5);
    a deflection roller (10) having a central longitudinal axis (18) and being provided at the second end of each hearth (1 to 5);
    a baking conveyor belt (9) guided over the driving roller (11) and the deflection roller (10);
    two bearings (13) for at least one roller (10) which are provided on outsides of the housing (8) and displaceable in a horizontal direction of displacement (19) in the lengthwise direction of the respective hearth (1 to 5);
    a recess (23) formed in each side wall (15) and penetrated by the displaceable roller (10) and adjusted to a maximal length of displacement (a) of the roller (10); and
    a sealing arrangement (25) for sealing the recess (23) in each position of displacement of the roller (10);
    wherein the sealing arrangement (25) comprises a sealing disk (30), which is disposed before the recess (23) pivotally on the roller (10) and which, upon displacements of the roller (10) in the direction of displacement (19), is pivotal about the central longitudinal axis (18) of the roller (10) by means of a guide pin (37) guided in a guiding groove (36), the edge of the sealing disk (30) being shaped such that on the one hand it covers the recess (23) in all positions of displacement and on the other hand is displaced in the direction of displacement only by a length which is substantially shorter than the length of displacement (a) of the roller (10).

2. A baking oven according to claim 1, wherein the sealing disk (30) rests sealingly on a sealing base plate (26) joined to the side wall (15), the guiding groove (36) being formed on the base plate (26) and the guide pin (37) being formed on the sealing disk (30).

3. A baking oven according to claim 1, wherein by means of a fixing ring (33) mounted on the roller (10), the sealing disk (30) is held in a sealing position to be non-displaceable relative to the central longitudinal axis (18).

4. A baking oven according to claim 1, wherein the sealing disk (30) is rotatably lodged on the roller (10) in the way of a sliding bearing by means of a guide ring (32).

5. A baking oven according to claim 1, wherein the guiding groove (36) extends substantially vertically at a distance from the axis of displacement (38) against the direction of displacement (19).

* * * * *